United States Patent [19]

Mori

[11] 4,312,772

[45] Jan. 26, 1982

[54] BEARING MATERIAL

[75] Inventor: Sanae Mori, Nagoya, Japan

[73] Assignee: Daido Metal Company Ltd., Japan

[21] Appl. No.: 173,932

[22] Filed: Aug. 14, 1979

[51] Int. Cl.$^3$ .............................................. C10M 7/02
[52] U.S. Cl. .................................... 252/12.2; 252/12; 252/12.6
[58] Field of Search ........................ 252/12, 12.2, 12.6

[56] References Cited

U.S. PATENT DOCUMENTS

| | | | |
|---|---|---|---|
| 2,995,462 | 8/1961 | Mitchell et al. | 252/12 |
| 3,218,255 | 11/1965 | Pratt | 252/12 |
| 3,464,845 | 9/1969 | Osborn et al. | 252/12 X |
| 3,516,933 | 6/1970 | Andrews et al. | 252/12 |
| 3,705,450 | 12/1972 | Morisaki | 252/12 X |
| 3,808,130 | 4/1974 | Schiefer et al. | 252/12 X |
| 4,000,982 | 1/1977 | Ueda | 252/12 X |

FOREIGN PATENT DOCUMENTS

| | | | |
|---|---|---|---|
| 772604 | 11/1967 | Canada | 252/12 |
| 1494078 | 4/1969 | Fed. Rep. of Germany | 252/12 |
| 213230 | 1/1973 | Fed. Rep. of Germany | 252/12 |
| 2,631,907 | 10/1977 | Fed. Rep. of Germany | 252/12 |
| 41-1868 | 2/1966 | Japan . | |
| 42-18887 | 9/1967 | Japan | 252/12.2 |
| 48-9847 | 3/1973 | Japan . | |
| 50-43005 | 4/1975 | Japan . | |
| 50-43006 | 4/1975 | Japan . | |
| 51-54812 | 5/1976 | Japan . | |
| 52-12259 | 1/1977 | Japan . | |
| 148476 | 7/1961 | U.S.S.R. | 252/12 |

Primary Examiner—Andrew Metz
Attorney, Agent, or Firm—Karl W. Flocks

[57] ABSTRACT

A porous metal or alloy layer is formed by sintering or the like on a metal backing formed of steel, for example. Copper or a copper-base alloy is generally used for forming the porous metal or alloy layer. The porous metal or alloy layer having the metal backing is impregnated with a mixture comprising 1–25% by volume of lead fluoride, 1–30% by volume of one or both of lead and a lead-tin alloy consisting of 3–30% by weight of tin and the remainder being lead, and the remainder essentially polytetrafluoroethylene, wherein the lead fluoride and one or both of the lead-tin alloy and lead being 2–25% by volume in total, thereby a bearing material of this invention is provided. Depending on the use to which the bearing material is put, at least one additive selected from the group consisting of molybdenum, tungsten disulfide, cadmium oxide, aluminum oxide, calcium fluoride, lithium fluoride, graphite, lead iodide, glass fibers, carbon fibers and a phosphate may be contained in 0.1–5% by volume in the mixture, to improve the performance of the bearing. The bearing material of this kind is suitable for use in shock absorbers of vehicles or the like which move in reciprocatory sliding movement under varying loads.

8 Claims, No Drawings

BEARING MATERIAL

TECHNICAL FIELD

This invention relates to materials suitable for use in sliding mechanisms adapted to move in reciprocatory sliding movement under varying loads, and more particularly to a bearing material suitable for use in a mechanism, such as a shock absorber of an automotive vehicle, adapted to move in reciprocatory sliding movement.

BACKGROUND ART

A number of proposals have hitherto been made with regard to this type of sliding material. For example, Japanese Patent Publications Nos. 2452/56 and 16950/64 disclose a hearing material having self lubricating property which includes a porous layer impregnated with polytetrafluoroethylene (hereinafter referred to as PTFE) or with an impregnating mixture consisting of PTFE, lead and/or lead oxide.

The known bearing material referred to hereinabove, however, has since become unsatisfactory in performance in view of the trend in the market that the load applied to the aforesaid sliding mechanism in which the bearing material is used is becoming increasingly higher.

DISCLOSURE OF THE INVENTION

This invention obviates the aforementioned disadvantage of the prior art. In this respect, the invention solves the problem by use of further additive or additives found to improve anti-friction properties thereby providing a bearing material having superior anti-friction performance.

The outstanding characteristic of the present invention resides in using additives of the property capable of improving the wear resistance of a bearing material when added to the known impregnating mixture. Such additives are divided into two groups of groups A alone and combined one of group A and group B. Group A consists of lead fluoride, and a lead-tin alloy or lead. Group B consists of a metal sulfide, such as molybdenum disulfide, tungsten disulfide, etc., a metal oxide, such as cadmium oxide, aluminum oxide, iron oxide, titanium oxide, etc., a metal fluoride, such as calcium fluoride, lithium fluoride, lead iodite, graphite, glass fibers, carbon fibers, and a phosphate. In addition to one or a plurality of additives of group A, one or more additives of group B (any two or more may display the same function and effects) may be added to the known impregnating mixture.

PREFERRED EMBODIMENTS

The bearing material according to the present invention is a composite bearing material having a metal backing and can be broadly classified into the following two types of composition.

(1) A bearing material comprising a porous material lined with a metal backing layer and impregnated with a mixture comprising 1–25% by volume of lead fluoride, 1–30% by volume of a lead-tin alloy and/or lead, and the balance essentially PTFE, the total of lead fluoride, lead-tin alloy and/or lead being 2–35% by volume.

(2) A bearing material comprising a porous material layer lined with a metal backing and impregnated with a mixture comprising 1–25% by volume of lead fluoride, 1–30% by volume of a lead-tin alloy and/or lead, 0.1–5% by volume of one or more than two additives selected from the group consisting of a metal sulfide, such as molybdenum disulfide, tungsten disulfide, etc., a metal oxide, such as cadmium oxide, aluminum oxide, iron oxide, titanium oxide, etc., a metal fluoride, such as calcium fluoride, lithium fluoride, etc., graphite, lead iodide, glass fibers, carbon fibers and a phosphate, and the balance essentially PTFE, wherein the lead fluoride, lead-tin alloy and/or lead, metal sulfide, metal oxide, metal fluoride, graphite, lead iodite, glass fibers, carbon fibers and phosphate being 2.1–35% by volume in total.

In respect of the impregnating mixture according to the present invention, permissible composition range of various constituent elements thereof and the effects achieved thereby will be summarized as follows:

(1) 1–30% by volume of a lead-tin alloy and/or lead.

(a) Lead reacts with oil in the lubricant to produce metallic soap thereby improving the surface characteristics of the bearing. However, lead may raise the problem of corrosion when used singly, so that tin is added in the form of a lead-tin alloy with a view to improving corrosion resistance of the impregnating mixture where corrosion resistance is of prime importance.

PTFE would not be directly transferred to and deposited on a shaft. Under unlubricated condition or a condition substantially similar thereto, a metal of low melting point (lead or tin) would be first melted and deposited on the shaft. The PTFE which is essentially not readily deposited on the shaft would then be deposited on the surface of metal of low melting point deposited on the shaft. As a result of this transfer and deposition of PTFE, sliding movement would take place between the PTFE transferred to and deposited on the shaft and the PTFE on the bearing, namely, between the portions of the same material of low friction (low shear). Thus low friction, low abrasion and long service life characteristics in boundary friction could be achieved.

(b) A lead-tin alloy also produces metallic soap by reacting with oil in the lubricant, as is the case with lead described hereinabove, thereby improving the surface characteristics of the bearing. With regard to corrosion resistance, the lead-tin alloy is much superior to lead, as is known in overlaying of plain metal bearings for automotive vehicles and ships. With regard to the composition of the alloying elements of the lead-tin alloy, the corrosion resistance property of the alloy with respect to lubricant would be reduced if tin were below 3% by weight, and the melting point thereof would be greatly lowered if the content of tin were above 30% by weight. Thus the composition range of tin in the lead-tin alloy is set at 3–30% by weight.

As a result of experiments conducted by the inventor, it has been ascertained through various experiments that tin plays the same role as lead in permitting PTFE to be transferred to and deposited on the shaft (through a coat of metal of low melting point) as described hereinabove even under no lubrication.

(c) When the content of a lead-tin alloy and/or lead described in (a) and (b) hereinabove is above 30% by volume, this, combined with the content of added lead fluoride, would reduce the bonding strength of the alloy surface layer and increase the amount of self wearing thereof. Also, when the content is below 1% by volume, surface characteristics (wear resistance, transfer and deposition effect of PTFE in unlubricated condition, and production of metallic soap under boundary lubrication) would be particularly reduced.

(2) 1–25% by volume of lead fluoride.

(a) The inventor found that when mixed with PTFE, lead fluoride in this range increases the wear resistance of the surface layer as a whole. This effect could be attributed to the fact that this particle of compound has a Moh's hardness number of 4 and is sufficiently hard to support a load so that the compound essentially functions as a solid lubricant in dry friction. Preferably, the particle size of lead fluoride is about 5 microns so as to enable the particles to be uniformly spread in the PTFE.

(b) When the proportion of lead fluoride is above 25% by volume, streaks develop. When the proportion is below 1% by volume, it is impossible to provide the surface layer with suitable wear resistance characteristics.

(3) 2–35% by volume in total of a lead-tin alloy and/or lead and lead fluoride (additives of group A).

When the proportion of the additives of group A in total is above 35% by volume, the bonding strength of the surface layer is reduced. Also, if the proportion is below 2% by volume, the wear resistance, toughness and load bearing ability of the surface layer is reduced, thereby reducing the performance of the bearing.

(4) 0.1–5% by volume in total of one or more than two additives selected from the group consisting of a metal sulfide, a metal oxide, a metal fluoride, graphite, lead iodide, glass fibers, carbon fibers and a phosphate (additives of group B).

It is lead fluoride that is mainly responsible for rendering the surface layer wear resistant. Addition in small amounts of the metal sulfide, metal oxide and the like has a synergistic effect and a suitable lapping effect to further increase the wear resistance of the surface layer.

When the proportion of the additives of group B in total is below 0.1% by volume, the additives of group B, of course, have no effect. However, when their proportion is above 5% by volume, the additives of group B would rather act as foreign matter to the bearing and cause steaks or grit to be produced as a result of abrasion, resulting in rupture of the seal and wear or breakage of the shaft and bearing itself. Thus the effective range of proportions of the additives of group B is 0.1–5% by volume.

An example of the invention will now be described.

EXAMPLE

A copper-base metal in powder form was sintered on a steel strip backing having copper plating layer formed thereon, to provide a porous material layer on the steel strip backing. Material to be impregnated of the compositions shown in Table 2 was applied to the porous material layer, then the porous material layer with the steel strip backing was passed through rolls, thereby causing pores of the porous copper-base metal layer to be impregnated with the impregnating material and covered with the impregnating material on the surface thereof. The copper-base metal layer thus impregnated was then baked at a temperature ranging from 327° to 400° C. and then passed through the rolls again to obtain uniform thickness in the copper-base metal layer, to provide an article of the prior art (specimen No. 1) and articles according to the present invention (specimens Nos. 2 to 9).

These specimens were tested under test conditions shown in Table 1. The results of the tests are shown in Table 2. Experiments conducted on the constituent elements of the impregnating material belonging to group B and their combination have shown similar results. Therefore, the additives of group B were considered to be equivalent to one another in effect, and description of various additives of group B is omitted. The lead-tin alloy used in the example had the composition of 7% by weight tin and the balance being lead.

As is clear from the example and the results of experiments, it has been found that the bearing material (specimens Nos. 2–9) according to the present invention, particularly the bearing material of specimen No. 8 containing at least one additive of group B, has a much higher wear resistance than the bearing material of the prior art (specimen No. 1) under high load.

TABLE 1

| | Test Conditions | | | | |
|---|---|---|---|---|---|
| | Maximum Load (kg) | Maximum Sliding Velocity (m/s) | No. of Cycles No. of Times of Repetition (10,000 Times) | Width of Sliding Movement (mm) | Lubricating oil |
| Specimens Nos. 1–9 | 230 | 1 | See Table 2. | 50 | Commercially available lubricant for shock absorbers |

(1) Testing Apparatus: sliding-type tester (device simulating the shock absorber of an automotive vehicle).
(2) Specimens tested: Cylindrical bearing material [22 mm in inner diameter and 20 mm in length (width)].

TABLE 2

| | Specimens Nos. | Components of impregnating Material (Volume Percent) | | | | Results of Experiments | | |
|---|---|---|---|---|---|---|---|---|
| | | | Additives of Group A | | | Additives of Group B One or More | No of Cycles | (Micron) | Wear Coefficient Micron $10^4$ Cycles |
| | | PTFE | Lead | Lead-Tin Alloy | Lead Fluoride | | | | |
| Prior Art | 1 | 80 | 20 | — | — | — | $400 \times 10^4$ | 100 | 0.250 |
| | 2 | 90 | — | 5 | 5 | — | $385 \times 10^4$ | 95 | 0.246 |
| | 3 | 78.5 | — | 14 | 7.5 | — | $710 \times 10^4$ | 75 | 0.105 |
| | 4 | 74 | — | 14 | 10 | — | $700 \times 10^4$ | 60 | 0.085 |
| This Invention | 5 | 66 | — | 14 | 20 | — | $600 \times 10^4$ | Streaks in Shaft | |

TABLE 2-continued

| | Specimens Nos. | Components of impregnating Material (Volume Percent) | | | | Results of Experiments | | |
|---|---|---|---|---|---|---|---|---|
| | | | Additives of Group A | | Additives of Group B One or More | | | Wear Coefficient Micron 10⁴ Cycles |
| | | PTFE | Lead | Lead-Tin Alloy | Lead Fluoride | | No of Cycles | (Micron) | |
| tion | 6 | 78.5 | 14 | — | 7.5 | — | 700 × 10⁴ | 80 | 0.114 |
| | 7 | 78.5 | 7 | 7 | 7.5 | — | 700 × 10⁴ | 75 | 0.107 |
| | 8 | 77.5 | — | 14 | 7.5 | Al₂O₃ 1.0 | 700 × 10⁴ | 35 | 0.050 |
| | 9 | 67.5 | — | 25 | 7.5 | — | 400 × 10⁴ | 90 | 0.225 |

INDUSTRIAL APPLICABILITY

As stated hereinabove, the bearing material according to this invention includes layer of porous metal of a copper base alloy formed on the surface of a metal backing such as by sintering, and the porous material layer is impregnated with PTFE or mixture PTFE with lead and/or lead oxide, and further being added with at least one of lead and a lead-tin alloy to improve the wear resistance of the bearing material. The PTFE or the impregnating mixture may be further added with at least one of the additives selected from the group referred to in this specification as group B consisting of a metal sulfide, such as molybdenum disulfide, tungsten disulfide, etc., a metal oxide, such as aluminum oxide, iron oxide, titanium oxide, etc., a metal fluoride, such as calcium fluoride, lithium fluoride, etc., graphite, glass fibers, carbon fibers and a phosphate. By adding the additives of group B, it is possible to further improve the characteristics of the bearing. Addition of these additives raises no problems with regard to the method for producing the bearing material of the type described.

It will be appreciated that the bearing material according to this invention is suitable for use in mechanical parts or components adapted to move in sliding movement, particularly in reciprocatory sliding movement, under varying loads. The bearing material according to the present invention is particularly suitable for use in shock absorbers of vehicles, particularly automotive vehicles, rod guides of hydraulic cylinders and gear pumps. It is believed that the invention has a high utility value in these fields.

I claim:

1. A bearing material comprising:
   a porous material layer lined with a metal backing, said porous layer being impregnated with a mixture comprising 1-25% by volume of lead fluoride; 1-30% by volume of lead, a lead-tin alloy consisting essentially of 3-30% by weight of tin the balance being lead, or mixtures thereof; and the remainder being polytetrafluoroethylene, said lead fluoride and said lead, lead-tin alloy or mixture thereof being 2-35% by volume in total.

2. A bearing material as set forth in claim 1, wherein said lead, lead-tin alloy or mixture thereof is lead, said lead being 1-30% by volume in said total mixture.

3. A bearing material as set forth in claim 1, wherein said lead, lead-tin alloy or mixture thereof is lead-tin alloy being 1-30% by volume in said total mixture.

4. A bearing material as set forth in claim 1, wherein said lead, lead-tin alloy or mixture thereof comprises a mixture of lead-tin alloy and lead, said lead-tin alloy and said lead being 1-30% by volume in total in said total mixture.

5. A bearing material comprising:
   a porous material layer lined with a metal backing said porous layer being impregnated with a mixture consisting essentially of:
   1-25% by volume of lead fluoride; 1-30% by volume of lead, a lead-tin alloy which contains 3-30% by weight of tin, or mixtures thereof; at least one additive selected from the group consisting of a metal sulfide, a metal oxide, a metal fluoride other than lead fluoride, graphite, lead iodide, glass fibers, carbon fibers, and a phosphate, said additive comprising 0.1-5% by volume in total; and the balance essentially polytetrafluoroethylene; the total of said lead fluoride, said lead, lead-tin alloy or mixture thereof and said at least one additive selected from the group consisting of said metal sulfide, said metal oxide, said metal fluoride, said graphite, said lead iodide, said glass fibers, said carbon fibers and said phosphate being 2.1-35% by volume.

6. A bearing material as set forth in claim 5, wherein said lead, lead-tin alloy or mixture thereof is lead being 1-30% by volume in said total mixture.

7. A bearing material as set forth in claim 5, wherein said lead, lead-tin alloy or mixture thereof is lead-tin alloy being 1-30% by volume in said total mixture.

8. A bearing material as set forth in claim 5, wherein said lead, lead-tin alloy or mixture thereof constitutes said mixture of lead and lead-tin alloy in an amount of 1-30% by volume in total in said total mixture.

* * * * *

UNITED STATES PATENT AND TRADEMARK OFFICE
CERTIFICATE OF CORRECTION

PATENT NO. : 4,312,772
DATED : January 26, 1982
INVENTOR(S) : Sanae Mori

It is certified that error appears in the above-identified patent and that said Letters Patent is hereby corrected as shown below:

On the title page, delete item "[ 22 ]" and insert the following:

-- [ 22 ]    PCT filed:            Dec. 13, 1978

[ 86 ]    PCT No.:             PCT/JP78/00053

§ 371 Date:          Aug. 14, 1979

§ 102(e) Date:      Aug. 14, 1979

[ 87 ]    PCT Pub. No.:       WO79/00388

PCT Pub. Date:      Jul. 12, 1979

[ 30 ] Foreign Application Priority Data

Dec. 14, 1977    [ JP ]    Japan...52-150311    --.

Signed and Sealed this

Seventh Day of June 1983

[SEAL]

Attest:

DONALD J. QUIGG

Attesting Officer          Acting Commissioner of Patents and Trademarks